US006934442B2

(12) United States Patent
Nagel et al.

(10) Patent No.: US 6,934,442 B2
(45) Date of Patent: Aug. 23, 2005

(54) UNDERSEA BRANCHING UNIT FOR AN UNDERSEA OPTICAL TRANSMISSION SYSTEM

(75) Inventors: Jonathan A. Nagel, Brooklyn, NY (US); Nigel Hunt Taylor, Chester (GB); Stephen G. Evangelides, Jr., Red Bank, NJ (US)

(73) Assignee: Red Sky Systems, Inc., So. Plainfield, NJ (US)

( * ) Notice: Subject to any disclaimer, the term of this patent is extended or adjusted under 35 U.S.C. 154(b) by 89 days.

(21) Appl. No.: 10/687,544

(22) Filed: Oct. 16, 2003

(65) Prior Publication Data

US 2005/0084207 A1 Apr. 21, 2005

(51) Int. Cl.[7] ................................................ G02B 6/28
(52) U.S. Cl. ......................................... 385/24; 385/48
(58) Field of Search .............................. 385/16–24, 31, 385/46–47

(56) References Cited

U.S. PATENT DOCUMENTS 6,535,309 B1 * 3/2003 Terahara ...................... 398/79

* cited by examiner

Primary Examiner—Phan T. H. Palmer
(74) Attorney, Agent, or Firm—Mayer Fortkort & Williams PC; Stuart H. Mayer, Esq.

(57) ABSTRACT

A branching unit is provided for interconnecting at least three undersea optical transmission cables. The branching unit includes first, second and third ports for receiving first, second and third undersea optical transmission cables, respectively. The first and second cables each include an electrical power conductor and a plurality of first optical fibers. The third cable is electrically unpowered and includes at least one drop optical fiber and at least one add optical fiber. An electrical power conductor segment is provided for electrically coupling the conductor in the first cable received in the first port to the conductor in the second cable received in the second port. A first optical fiber segment optically couples a first of the plurality of first optical fibers in one of the first or second cables to the drop optical fiber of the third cable. A second optical fiber segment optically couples a second of the plurality of first optical fibers in one of the first and second cables to the add optical fiber of the third cable. First and second optical amplifiers are located along the first and second optical fiber segments, respectively so that the first optical amplifier provides optical gain to traffic being dropped on the drop optical fiber of the third cable and the second optical amplifier provides optical gain to traffic being added on the add optical fiber of the third cable. At least one electrically conductive path is provided for supplying electrical energy from at least one of the electrical power conductors to each of the optical amplifiers.

11 Claims, 19 Drawing Sheets

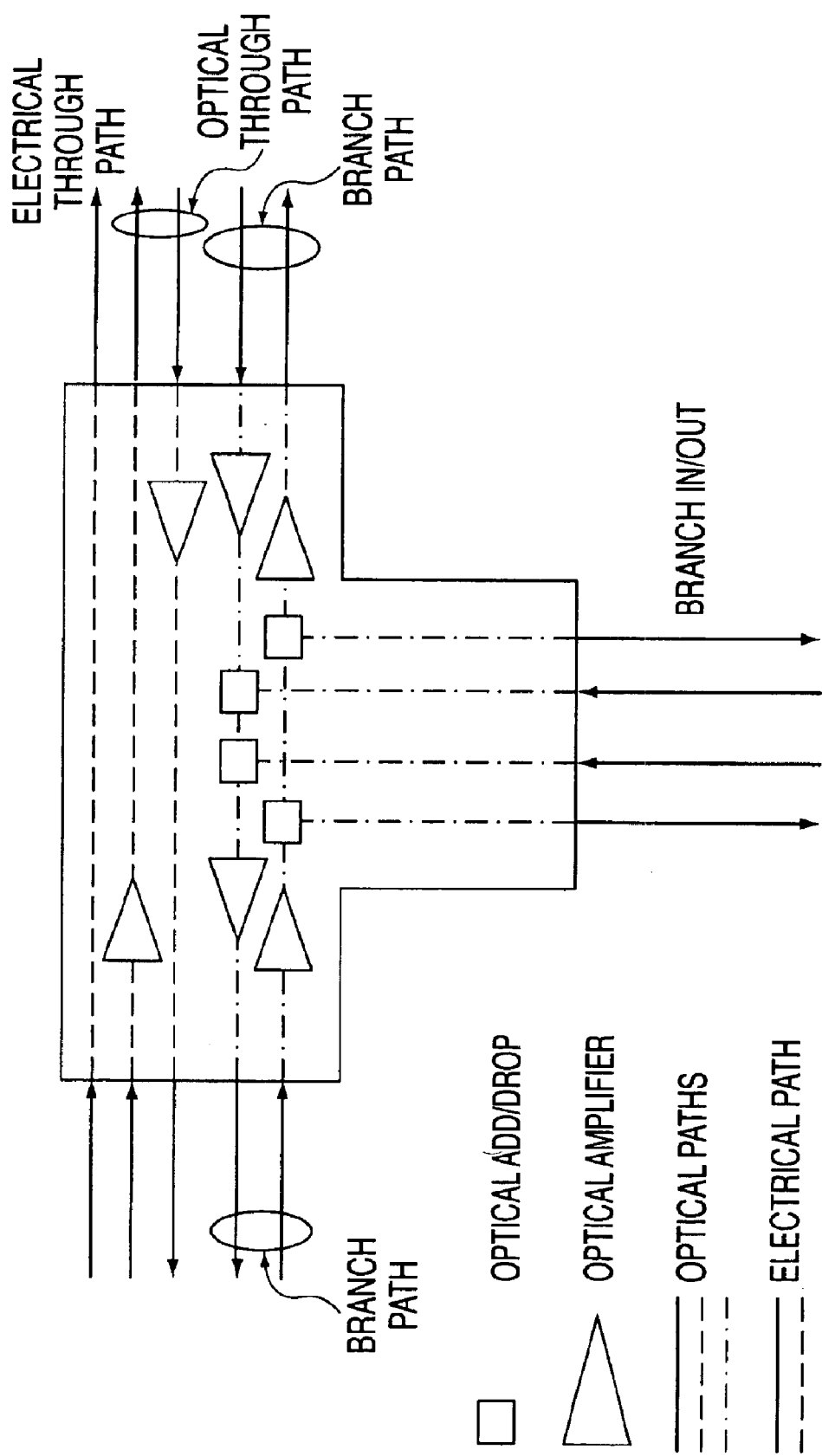

UNDERSEA BRANCHING UNIT FOR AN UNDERSEA OPTICAL TRANSMISSION SYSTEM

FIELD OF THE INVENTION

The present invention relates generally to undersea or submarine branching units for an undersea optical transmission system, and more particularly to an undersea branching unit that does not require electrical power to be rerouted in the event of a cable fault.

BACKGROUND OF THE INVENTION

Undersea optical communication systems include land-based terminals containing transmitters and receivers connected by a cabled-fiber-transmission medium that includes periodically spaced repeaters, which contain optical amplifiers whose purpose is to compensate for the optical attenuation in the cabled fiber. As the repeaters are usually placed undersea and away from power sources, power must be supplied remotely to the repeaters. The cabled fiber therefore usually contains a copper conductor to carry electrical power to the repeaters from the terminals. These undersea systems serve to carry optical communication signals (i.e., traffic) between the terminals. The traffic on these systems can consist of voice, data, television, Internet traffic, international telephone traffic, etc. Consequently, the revenue lost when the system is down can be significant. Therefore, these systems must have high reliability and availability.

To provide increased flexibility in undersea network architecture beyond simple point-to-point interconnection between land-based terminals, a branching unit is provided, which allows traffic to be split or switched to/from multiple landing points. Conventional branching units typically manage the cabled-fiber interconnections and the power conductor paths among three cables. The latter is necessary to maintain as much traffic carrying capability when a fault occurs in one of the three cable legs, which increases the availability of the system.

A power-switched branching unit is configured to allow re-routing of electrical power from the terminals in the presence of a fault in one of the cables, so that two of the three cable legs in a branched system can still be powered. Such a power-switched branching unit usually has three operating states: normal, alternate-normal, and grounded-trunk. The power-switched branching unit can be configured in any of these three states by the appropriate power-up sequencing from the terminals of the three legs. The reconfiguration of the branching unit is typically performed by a relatively complex series of relays, which significantly adds to the cost and complexity of the device.

Accordingly, it would be desirable to provide an undersea branching unit that does not require such complex active power control.

SUMMARY OF THE INVENTION

In accordance with the present invention, a branching unit is provided for interconnecting at least three undersea optical transmission cables. The branching unit includes first, second and third ports for receiving first, second and third undersea optical transmission cables, respectively. The first and second cables each include an electrical power conductor and a plurality of first optical fibers. The third cable is electrically unpowered and includes at least one drop optical fiber and at least one add optical fiber. An electrical power conductor segment is provided for electrically coupling the conductor in the first cable received in the first port to the conductor in the second cable received in the second port. A first optical fiber segment optically couples a first of the plurality of first optical fibers in one of the first or second cables to the drop optical fiber of the third cable. A second optical fiber segment optically couples a second of the plurality of first optical fibers in one of the first and second cables to the add optical fiber of the third cable. First and second optical amplifiers are located along the first and second optical fiber segments, respectively so that the first optical amplifier provides optical gain to traffic being dropped on the drop optical fiber of the third cable and the second optical amplifier provides optical gain to traffic being added on the add optical fiber of the third cable. At least one electrically conductive path is provided for supplying electrical energy from at least one of the electrical power conductors to each of the optical amplifiers.

In accordance with one aspect of the invention, the third cable includes a plurality of drop optical fibers and a plurality of add optical fibers. Additionally, a third optical fiber segment optically couples a first of the plurality of first optical fibers in the other of the first or second cables to one of the drop optical fibers of the third cable. A fourth optical fiber segment optically couples a second of the plurality of first optical fibers in the other of the first and second cables to the one of the add optical fiber of the third cable.

In accordance with another aspect of the invention, third and fourth optical amplifiers are located along the third and fourth optical fiber segments, respectively so that the third optical amplifier provides optical gain to traffic being dropped and the fourth optical amplifier provides optical gain to traffic being added. At least a second electrically conductive path is provided for supplying electrical energy from at least one of the electrical power conductors to each of the optical amplifiers.

In accordance with another aspect of the invention, first and second cables each include a third optical fiber and another optical fiber segment optically coupling the third optical fiber of the first cable to the second optical fiber of the second cable.

In accordance with another aspect of the invention, another optical amplifier is located along another optical fiber segment for providing optical gain to through traffic traversing the optical fiber segment.

In accordance with another aspect of the invention, a branching unit is provided for interconnecting at least three undersea optical transmission cables. The branching unit includes first, second and third ports for receiving first, second and third undersea optical transmission cables, respectively. The first and second cables each include an electrical power conductor and a plurality of first optical fibers. The third cable is electrically unpowered and includes at least one drop optical fiber and at least one add optical fiber. An electrical power conductor segment is provided for electrically coupling the conductor in the first cable received in the first port to the conductor in the second cable received in the second port. A first optical fiber segment optically couples a first of the plurality of first optical fibers in the first cable to a first of the plurality of first optical fibers in the second cable. A second optical fiber segment optically couples a second of the plurality of first optical fibers in the first cable to a second of the plurality of first optical fibers in the second cable. A first add/drop element is located along the first optical fiber segment for dropping traffic at one or more selected wavelengths to the drop optical fiber of the third cable. A second add/drop element is located along the second optical fiber segment for adding traffic at one or more selected wavelengths to the add optical fiber of the third cable. A first optical amplifier receives the traffic from the first add/drop element and providing optical gain thereto. A second optical amplifier receives the traffic from the add optical fiber of the third cable and provides optical gain thereto. At least one electrically conductive path is provided for supplying electrical energy from at least one of the electrical power conductors to each of the optical amplifiers.

BRIEF DESCRIPTION OF THE DRAWINGS

FIGS. 4–19 show other alternative embodiments of the invention.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present inventors have recognized that in many cases a simplified branching unit may be employed in which electrical power is only provided to two of its legs. The third leg employs a cable that does not incorporate an electrical conductor and hence serves as an unrepeatered leg. Because only two legs are powered instead of three, the complex power-switching arrangement required in conventional branching units may be eliminated. It should be noted that although ITU-T Recommendation G.977 strictly defines a branching unit as an optical device that provides both electrical and optical interconnections among three submarine or undersea cables, the term branching unit as used herein more broadly encompasses a device that provides optical interconnections among three submarine cables and electrical interconnection between at least two of the cables.

Figure 1:
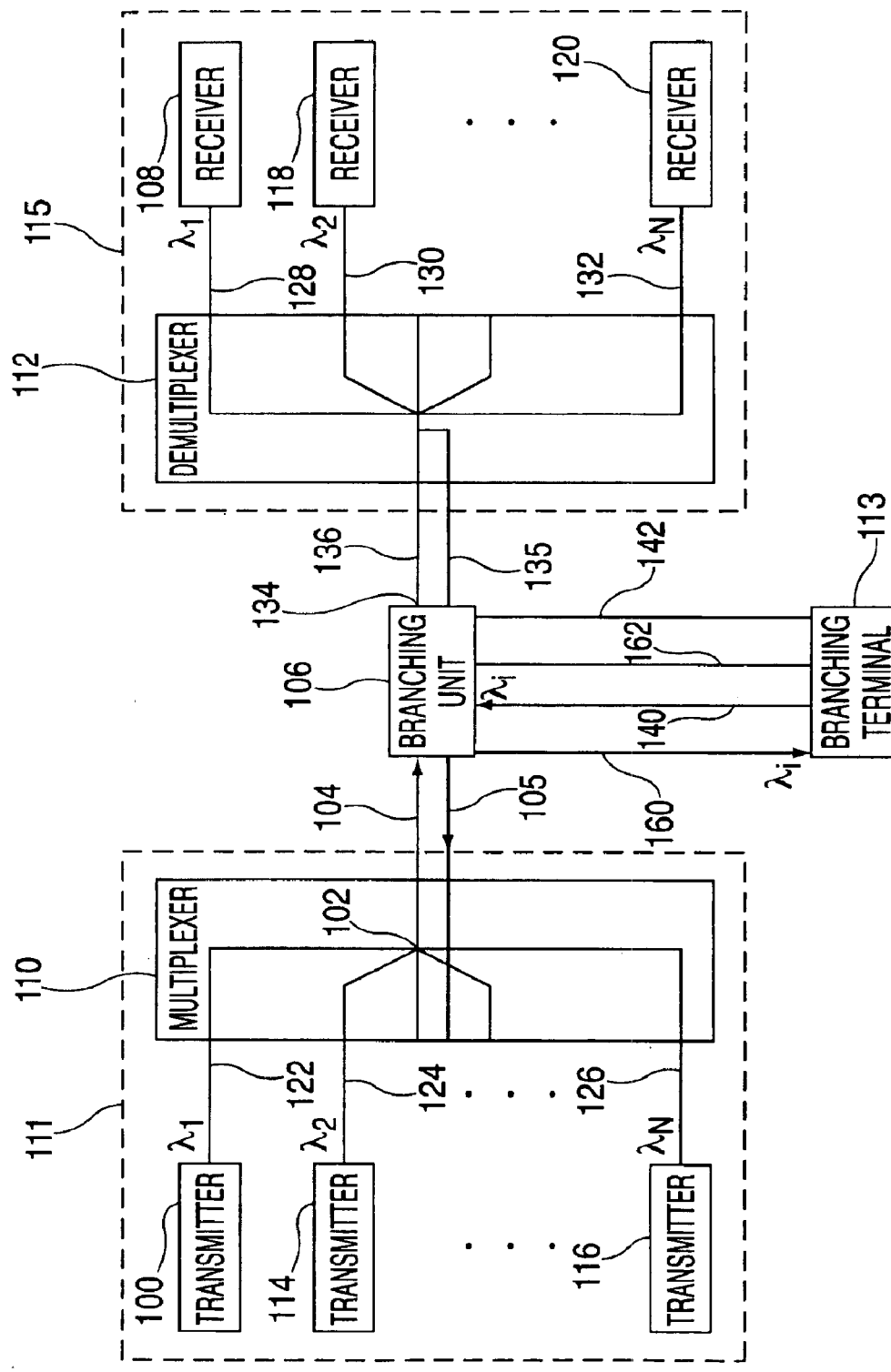
FIG. 1 illustrates a block diagram of a trunk and branch undersea WDM optical transmission system in which an embodiment of the present invention may be employed.

FIG. 1 illustrates a block diagram of a trunk and branch undersea WDM optical transmission system in which an embodiment of the present invention may be employed. The network includes transmission trunk terminal 111 and receiver trunk terminal 115 interconnected by optical fiber links 104, 136, 105 and 135, which support bi-directional optical communication. The network also includes branching unit 106 and branch terminal 113. Branch terminal 113 includes transmitters and receivers (not shown) similar to trunk terminals 111 and 115. Branching unit 106 is disposed in the transmission path between trunk terminals 111 and 115. Branching unit 106 directs selected wavelengths to branch terminal 113.

As shown, trunk terminal 111 includes optical communication transmitters 100, 114 and 116 to transmit optical communications channels at wavelength $\lambda_1, \lambda_2 \ldots \lambda_N$, respectively. Multiplexer 110 multiplexes these signals together to form multiplexed signal 102. Multiplexed signal 102 is launched into optical fiber 104 for transmission to the receiving end. Since optical fiber 104 is a high-capacity trunk, signal 102 is also referred to as "trunk traffic". During transmission, multiplexed signal 102 passes through branching unit 106. Branching unit 106 places multiplexed signal 102 back onto optical fiber 136. At the receiving trunk terminal 115, demultiplexer 112 demultiplexes and routes $\lambda_1, \lambda_2 \ldots \lambda_N$ to receivers 108, 118 . . . 120, respectively.

Branching unit 106 places wavelength $\lambda_i$ on optical fiber 160 and thereby branches $\lambda_i$ to branch terminal 113. The optical information signal of wavelength $\lambda_i$ is referred to as "branch traffic," since branching unit 106 branches it from trunk 104 to optical fiber 160. Branch terminal 113 in turn transmits a different optical information signal at wavelength $\lambda_i$ onto optical fiber 140. Branching unit 106 replaces $\lambda_i$, which was dropped onto optical fiber 160, with the $\lambda_i$ it receives from branch terminal 113 on optical fiber 140. The branch unit 106 multiplexes this $\lambda_i$ with $\lambda_1, \lambda_2, \ldots \lambda_n$, forming multiplexed optical signal 134, which is launched on optical fiber 136 toward receiving trunk terminal 115. Optical fibers 162 and 142 are used to add and drop traffic from terminal 115 in a manner similar to that described above for terminal 111.

It is worthy to note that multiplexed signal 134 is different from multiplexed signal 102 since the optical information signal of wavelength $\lambda_i$ has been replaced with a different optical information signal of wavelength $\lambda_i$. That is, although multiplexed signal 102 and 134 may include the same signal wavelengths, they do not necessarily carry the same information.

Figure 2:
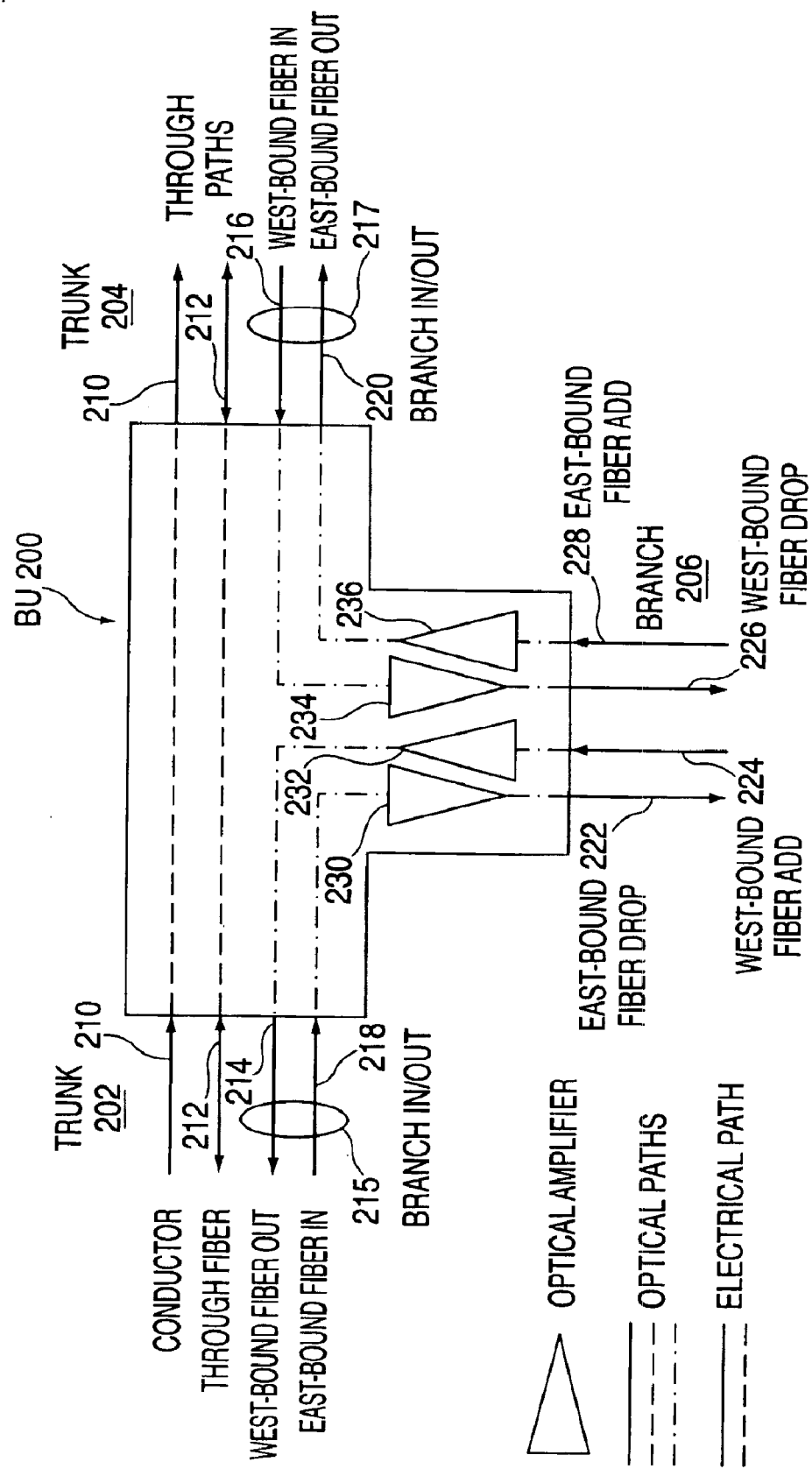
FIG. 2 shows one embodiment of the branching unit constructed in accordance with the present invention.

FIG. 2 shows one embodiment of the branching unit 200 constructed in accordance with the present invention. Branching unit 200 is a three port device for receiving trunk 202, trunk 204 and branch 206. Trunks 202 and 204 include through paths for an electrical conductor 210 and a through fiber 212. Trunk 202 also includes bidirectional fiber pair 215 and trunk 204 includes bidirectional fiber pair 217. Bidirectional fiber pair 215 includes westbound fiber out 214 and eastbound fiber in 218. Bidirectional fiber pair 217 includes westbound fiber in 216 and eastbound fiber out 220.

Branching unit 200 is a full fiber add/drop device in which the incoming traffic on fiber in 218 of trunk 202 is dropped to branch 206 and the outgoing traffic on fiber out 214 is added from branch 206. Likewise, incoming traffic on fiber in 216 of trunk 204 is dropped to branch 206 and outgoing traffic on fiber 220 of trunk 204 is added from branch 206.

Branch 206 includes eastbound fiber drop 222, westbound fiber add 224, westbound fiber drop 226 and eastbound fiber add 228. Eastbound fiber drop 222 receives traffic from eastbound fiber in 218 and westbound fiber add 224 adds traffic to westbound fiber out 214. Westbound fiber drop 226 receives traffic from westbound fiber in 216 and eastbound fiber add 228 adds traffic to eastbound fiber out 220.

In accordance with the present invention, branch 206 does not include an electrical conductor and, therefore, branch 206 is electrically isolated from trunks 202 and 204. As a result branching unit 200 does not require a complex power switching arrangement to individually isolate the trunks and branch from one another. Because branch 206 is unpowered and hence is unrepeatered, the distance between the branching unit 200 and branching terminal 113 seen in FIG. 1 is limited.

To increase the distance between branching unit 200 and branching terminal 113 the branching unit 200 includes optical amplifiers 230, 232, 234, and 236. Optical amplifier 230 provides optical gain to the traffic being dropped on fiber drop 222, optical amplifier 232 provides optical gain to the traffic being added by fiber add 224, optical amplifier 234 provides optical gain to the traffic being dropped by fiber drop 226, and optical amplifier 236 provides optical gain to the traffic being added by fiber add 228. The use of such amplifiers allows the maximum distance between the branching unit 200 and the shore-based branching terminal to be substantially extended.

Optical amplifiers 230, 232, 234 and 236 may be any appropriate optical amplifiers such as rare-earth doped optical amplifiers. Each rare-earth doped optical amplifier contains a length of doped fiber that provides a gain medium, an energy source that pumps the doped fiber to provide gain, and a means of coupling the pump energy into the doped fiber without interfering with the signal being amplified. The electrical power required by the optical amplifiers may be conveniently supplied by the conductor 210 that is employed in trunks 202 and 204.

Figure 3:
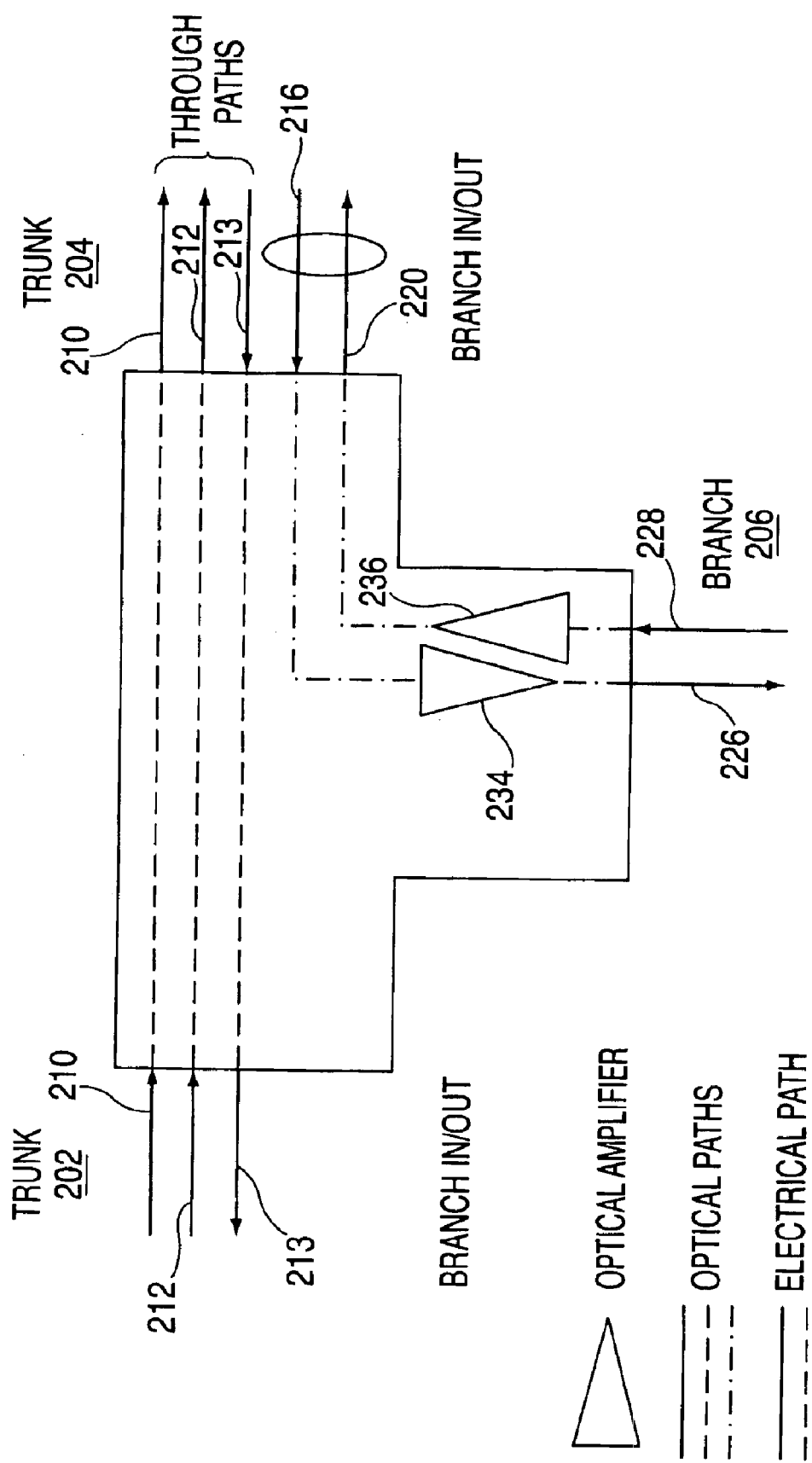
FIG. 3 shows an embodiment of the invention in which traffic can be simultaneously added and dropped to only a single fiber pair.

The embodiment of the invention shown in FIG. 2 can simultaneously add and drop traffic to and from fiber pairs 215 and 217. Of course, the present invention encompasses many other configurations as well, the choice of which will generally depend on the functionality that is required. For example, FIG. 3 shows an embodiment of the invention in which traffic can be simultaneously added and dropped to only a single fiber pair 217. In FIGS. 2 and 3, as well as the figures that follow, like elements are denoted by like reference numerals.

Figure 4:
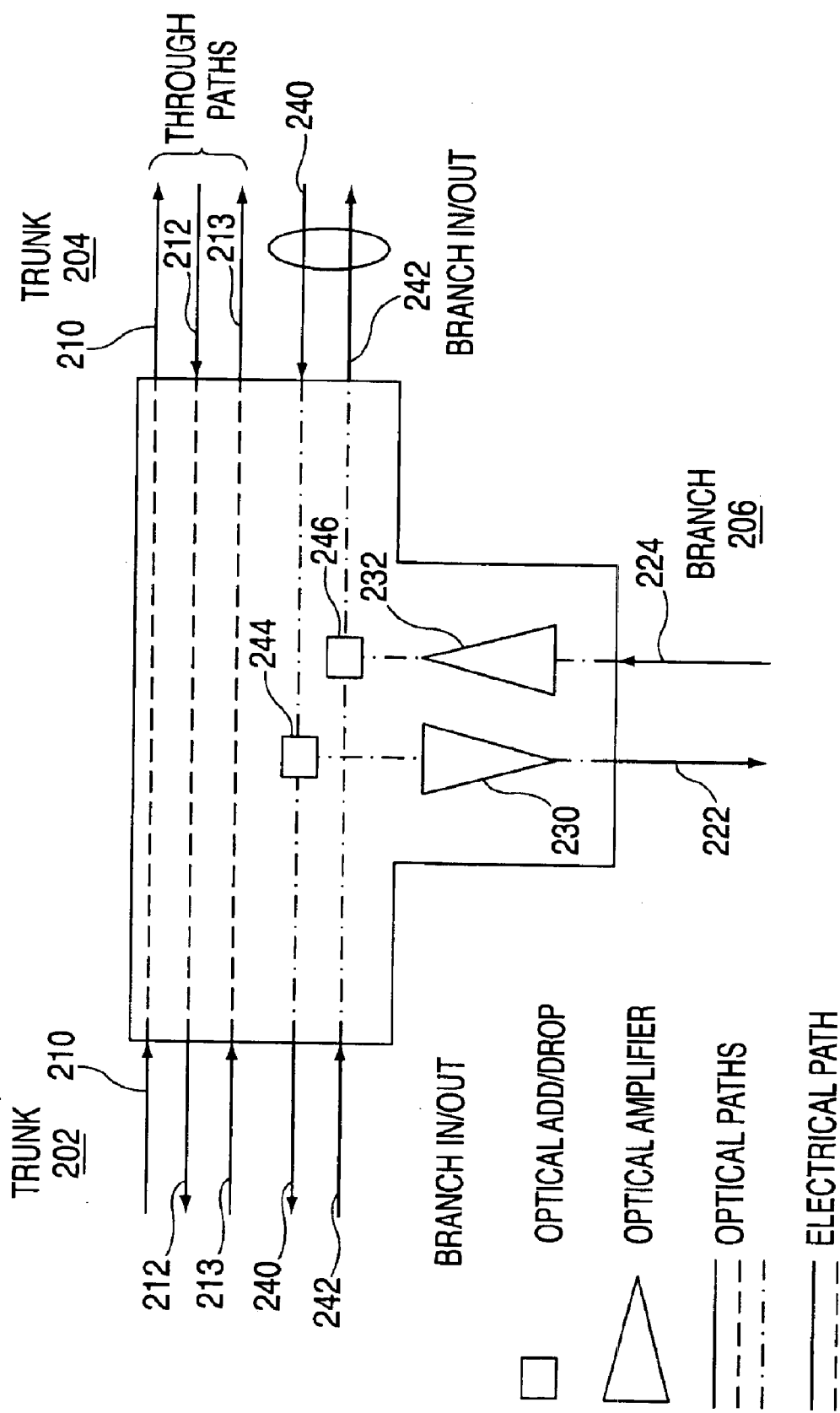
Figure 5:
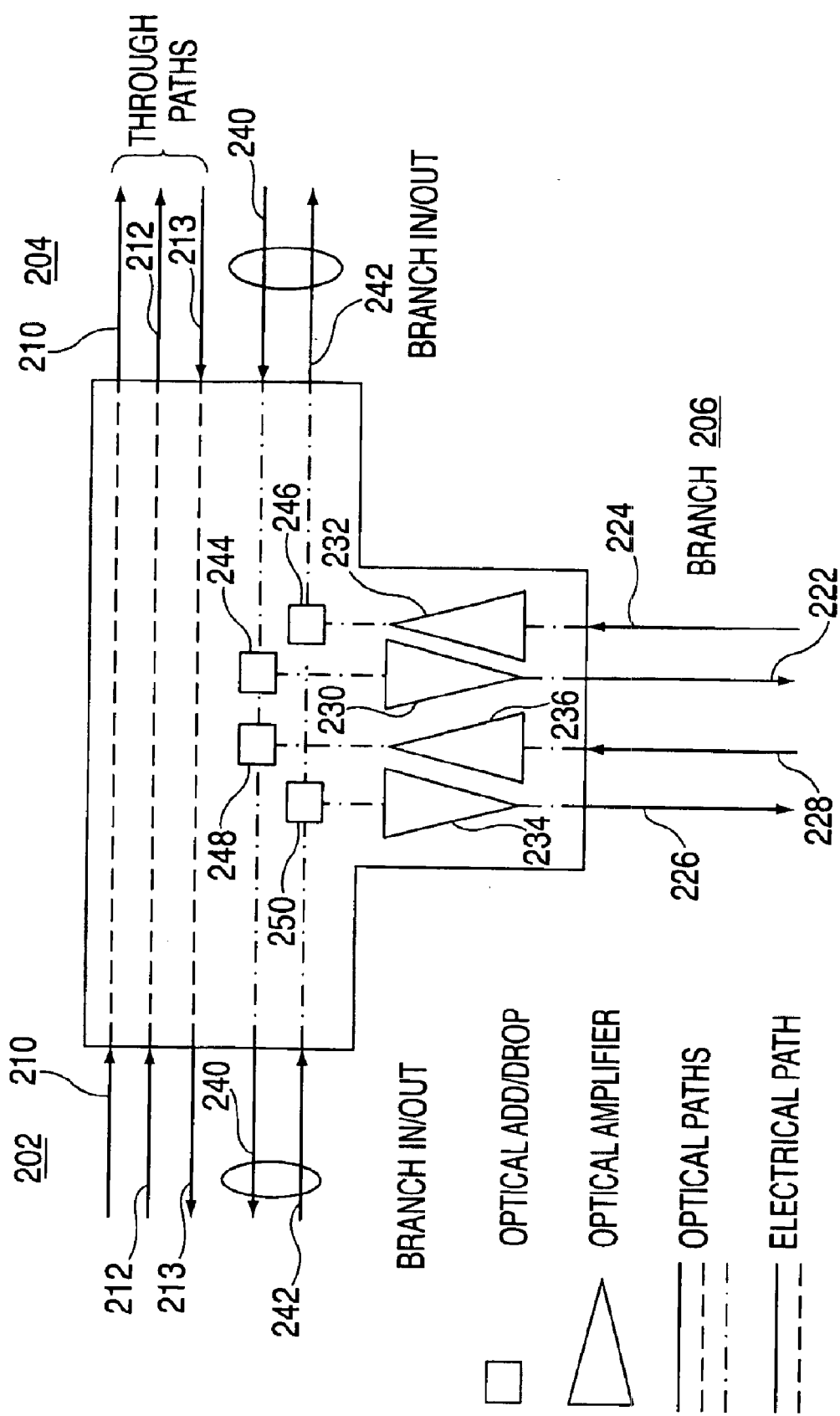

In other embodiments of the invention, rather than adding or dropping all wavelengths traversing a given fiber, only one or more wavelengths of a WDM optical signal may be added or dropped. For example, in the embodiment of the invention shown in FIG. 4 all the fibers 210, 212, 213, 240 and 242 are through fibers. Add/drop elements 244 and 246 are located in fibers 240 and 242, respectively. Add/drop element 244 serves to drop one or more selected wavelengths from fiber 240 to fiber drop 222 in branch 206 and add/drop element 246 serves to add one or more selected wavelengths from fiber add 224 in branch 206 to fiber 242. The embodiment of the invention shown in FIG. 5 is similar to that depicted in FIG. 4, except that in FIG. 5 fibers 240 and 242 each include an additional add/drop element 248 and 250, respectively. In this way one or more selected wavelengths can be simultaneously added to fiber 240 from add fiber 228 and dropped from 242 to drop fiber 226.

Figure 6:
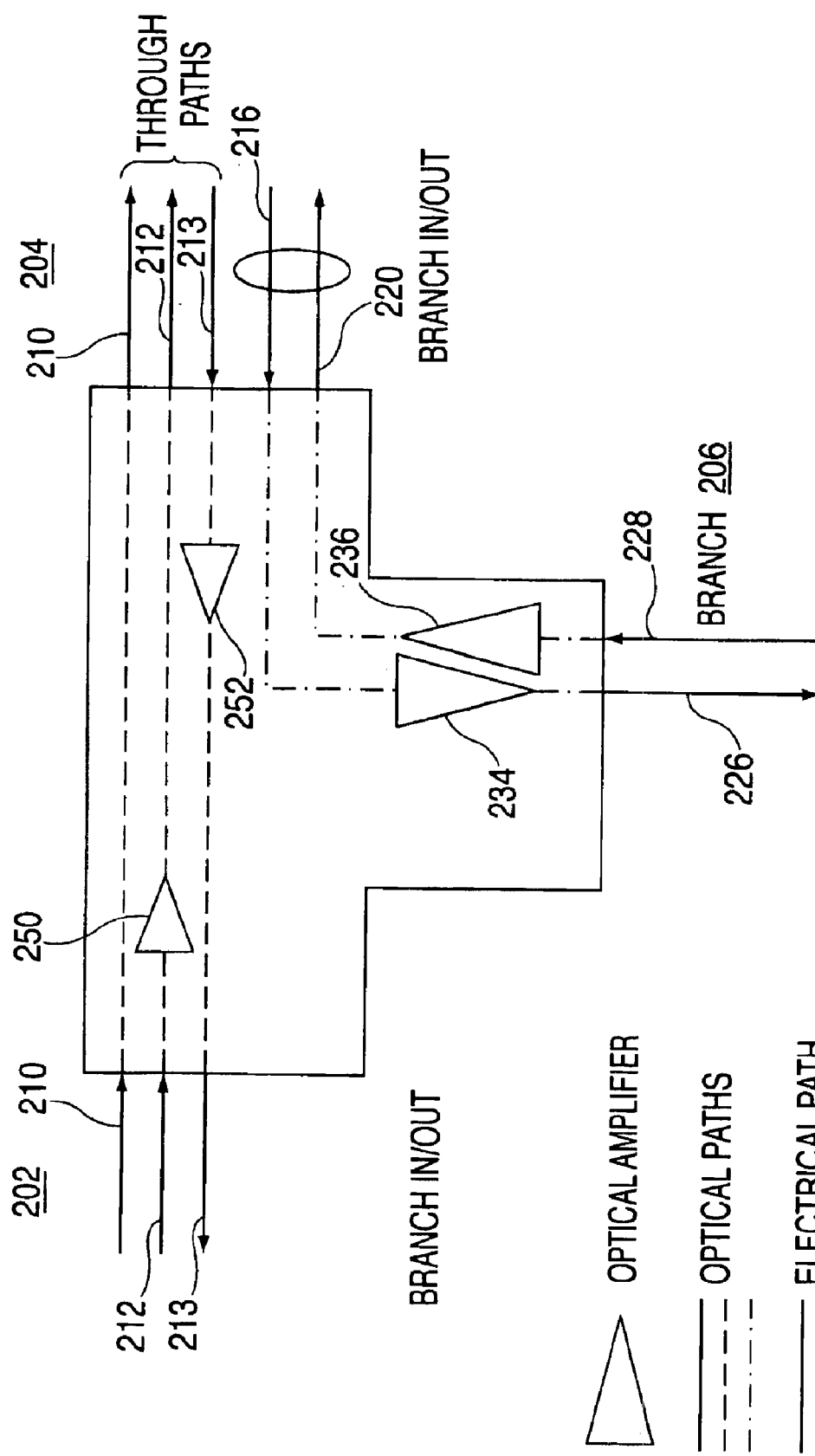
Figure 7:
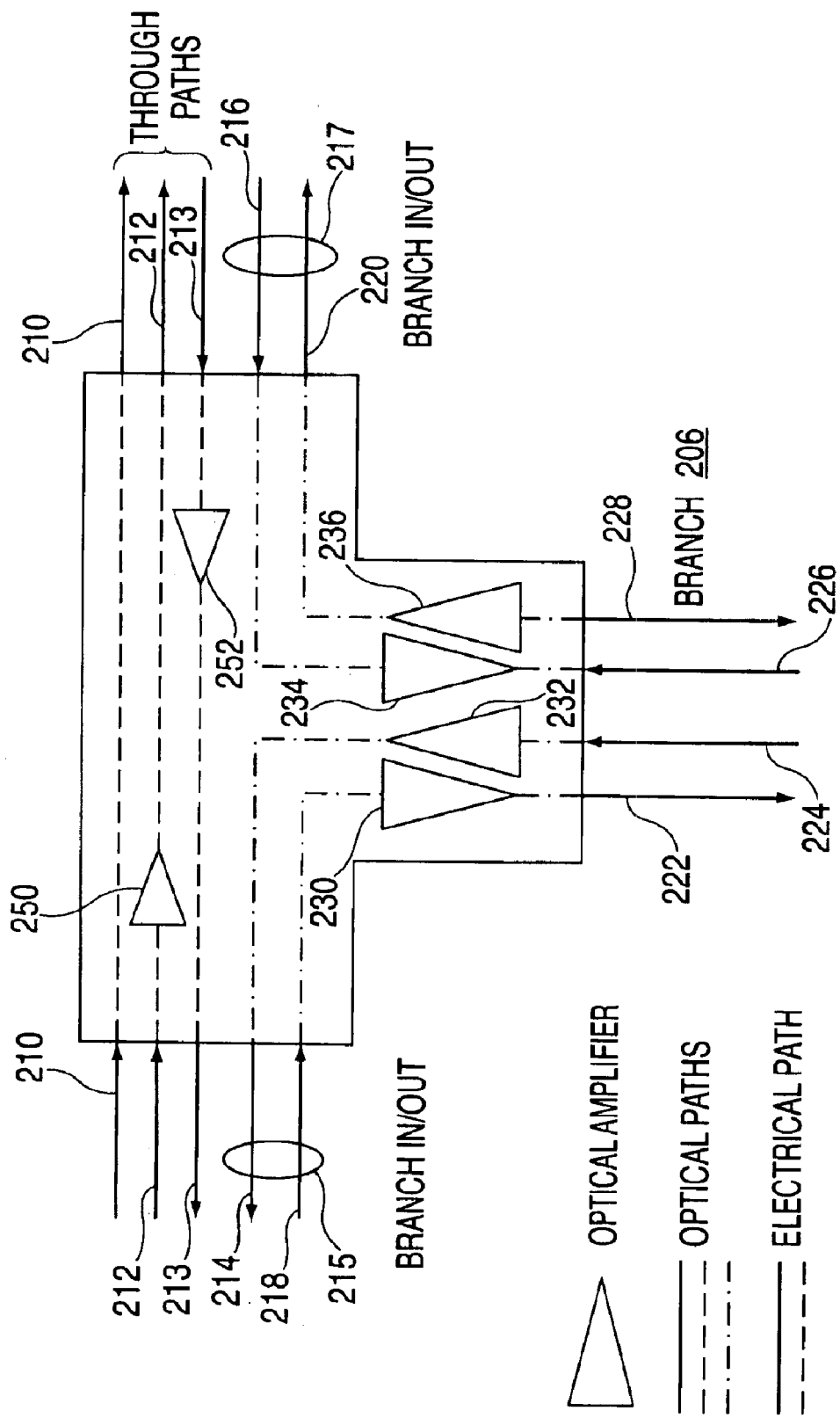
Figure 8:
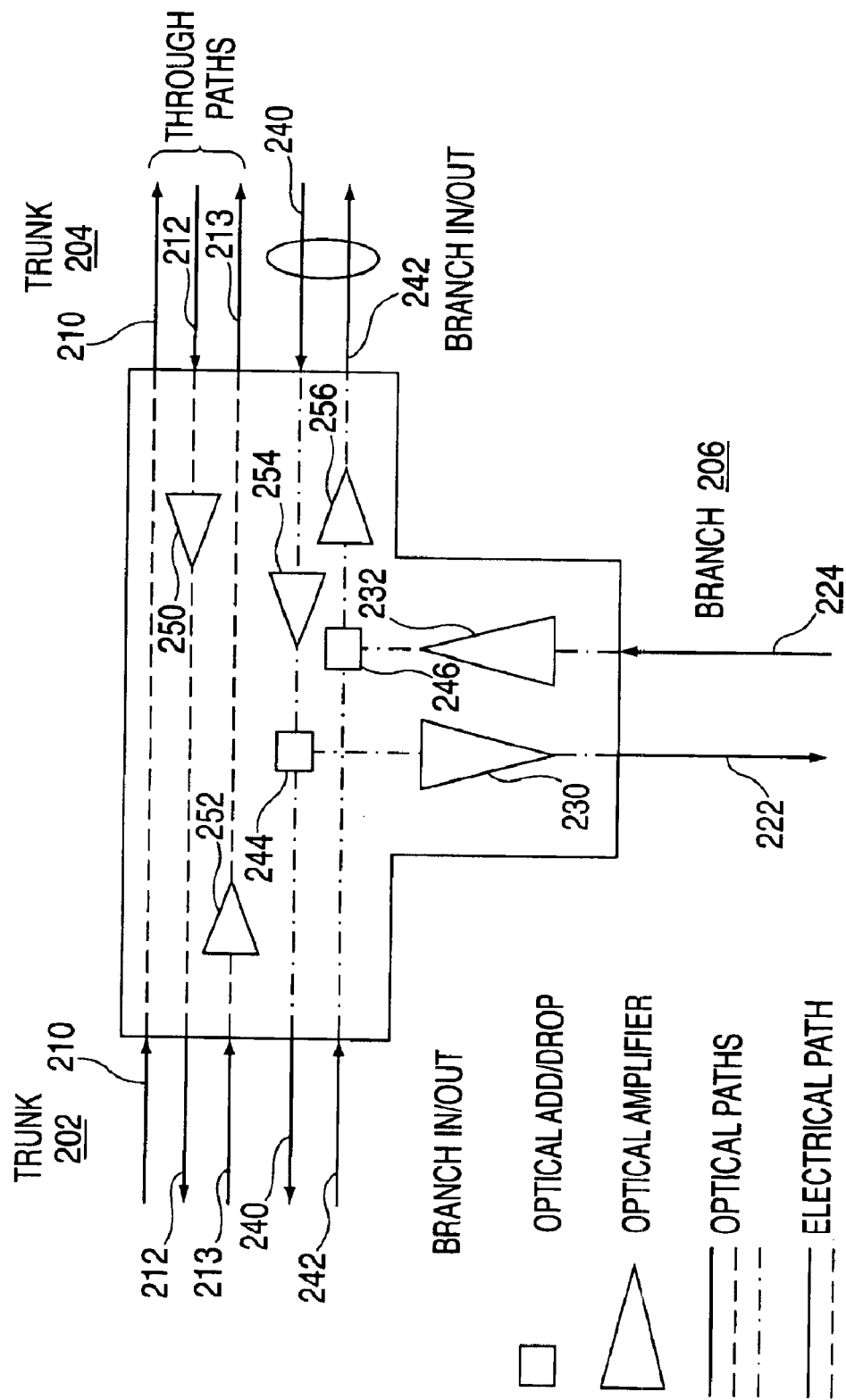
Figure 9:
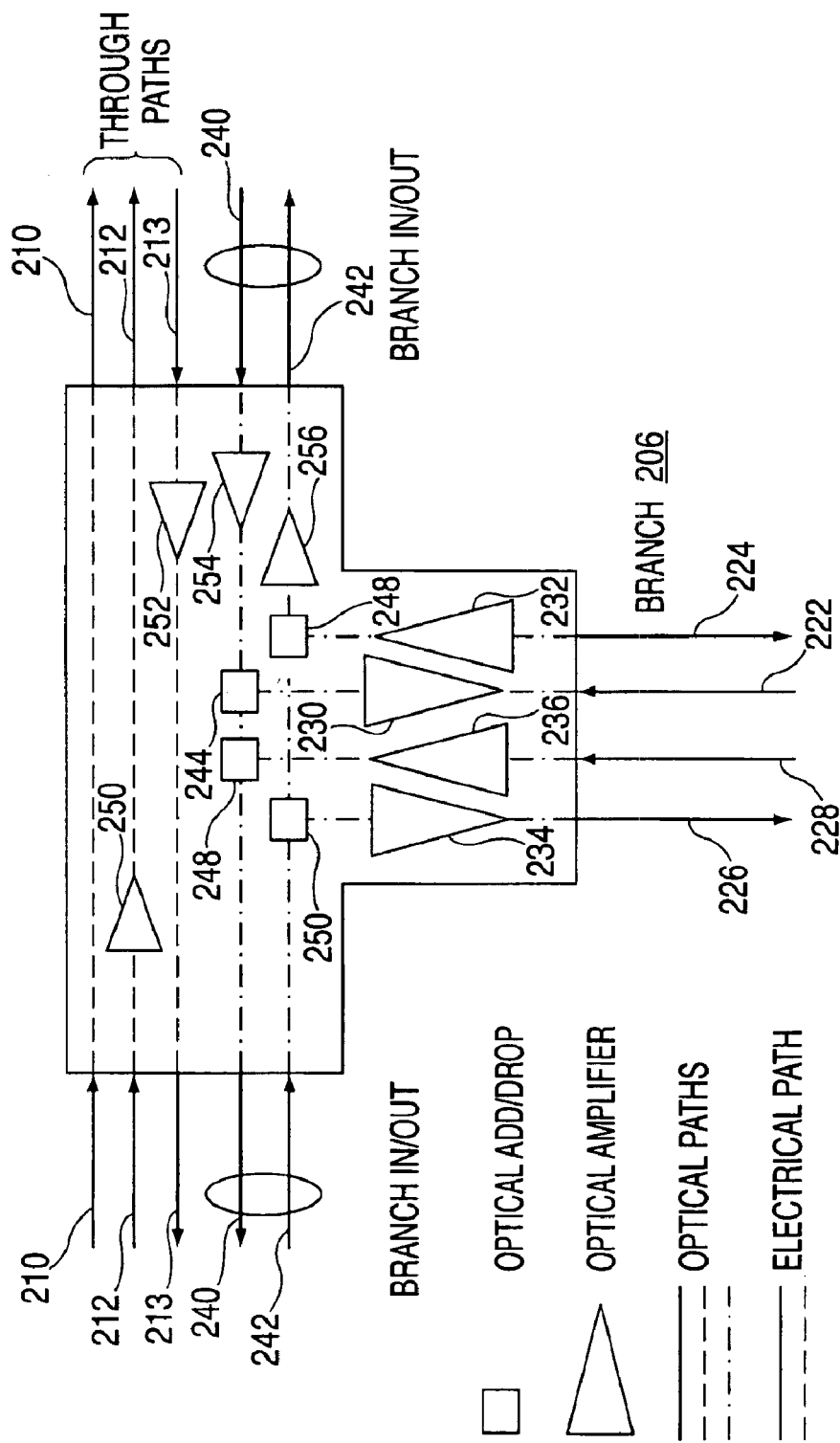
Figure 10:
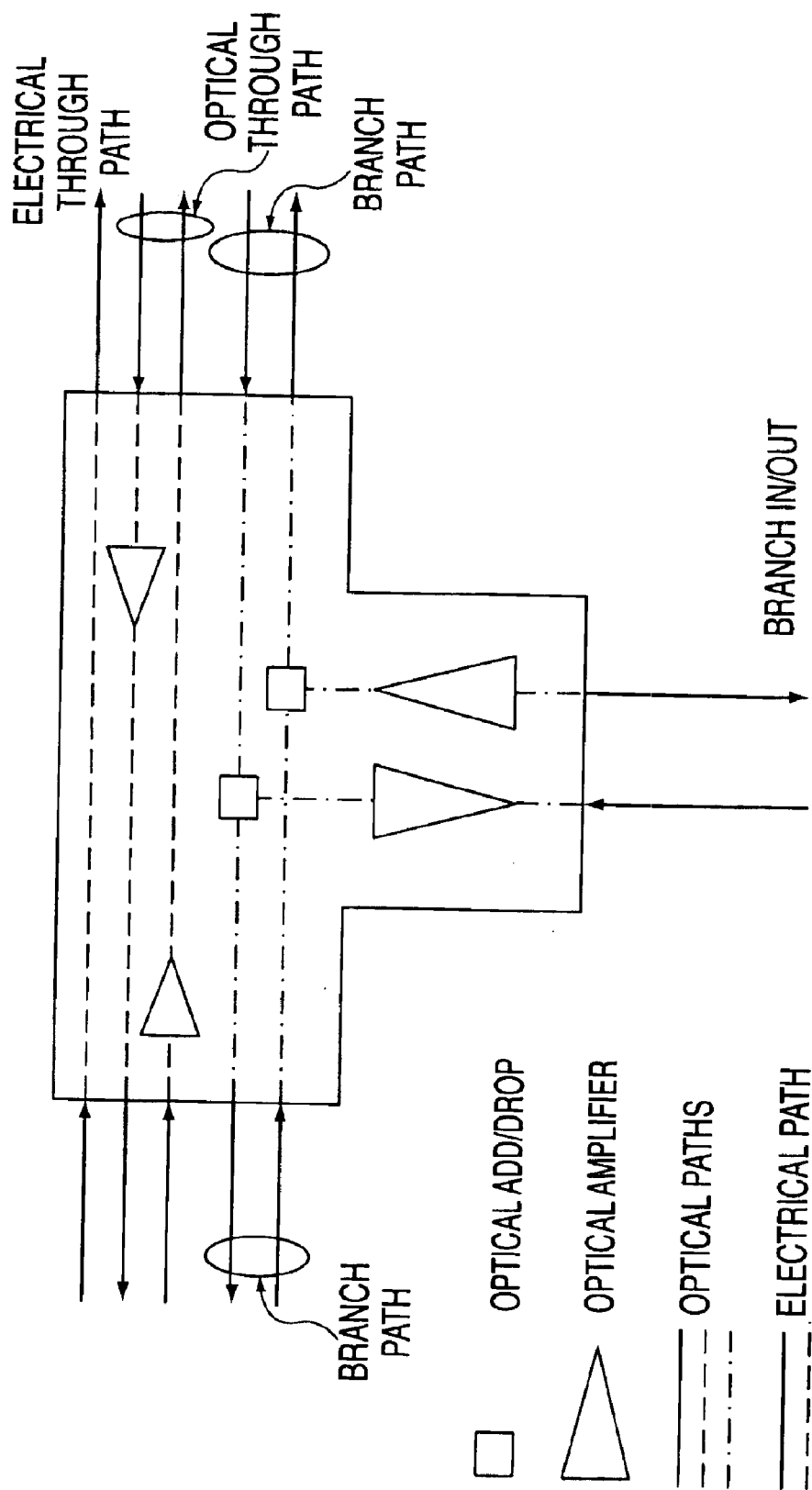
Figure 11:
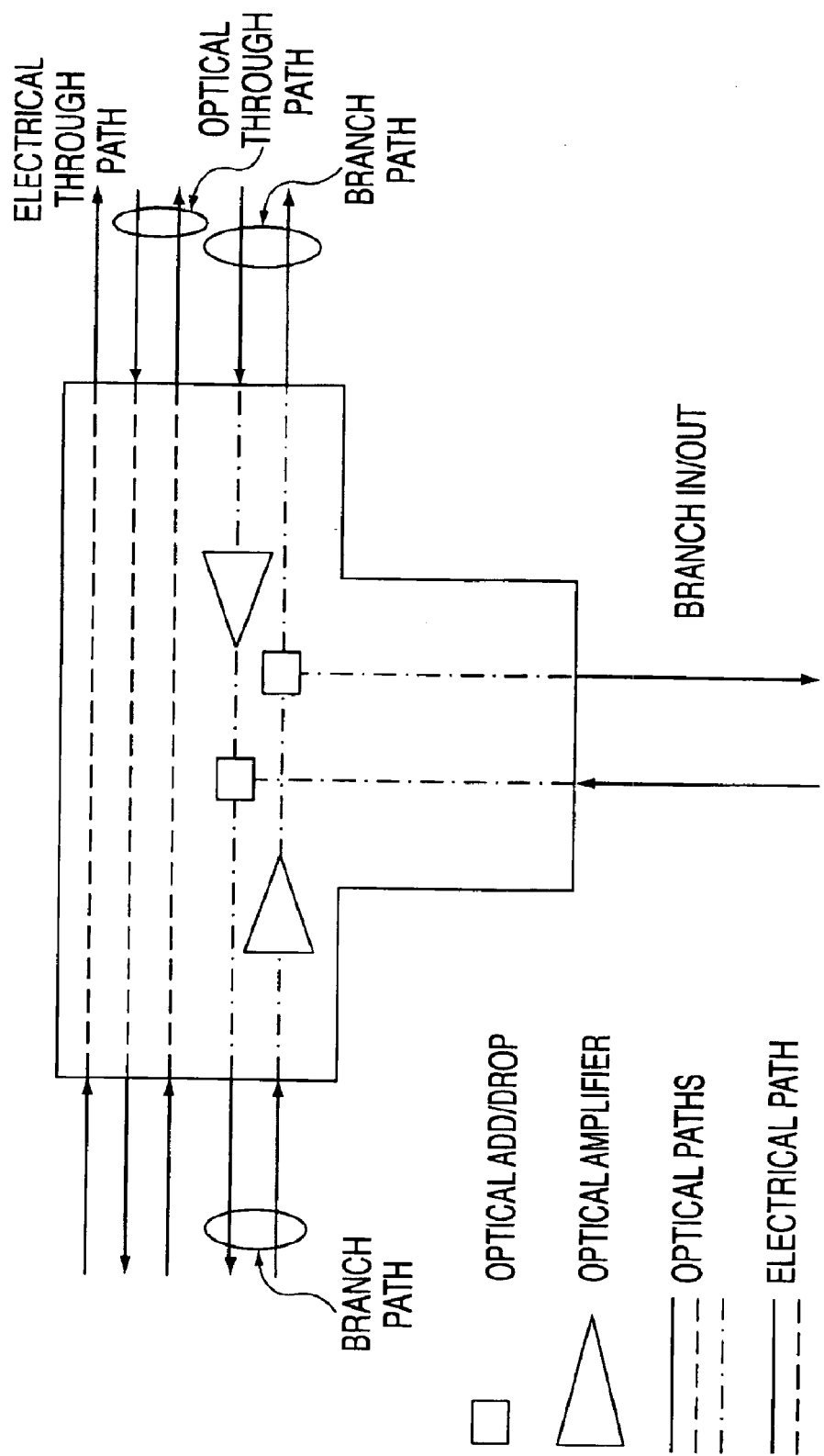
Figure 12:
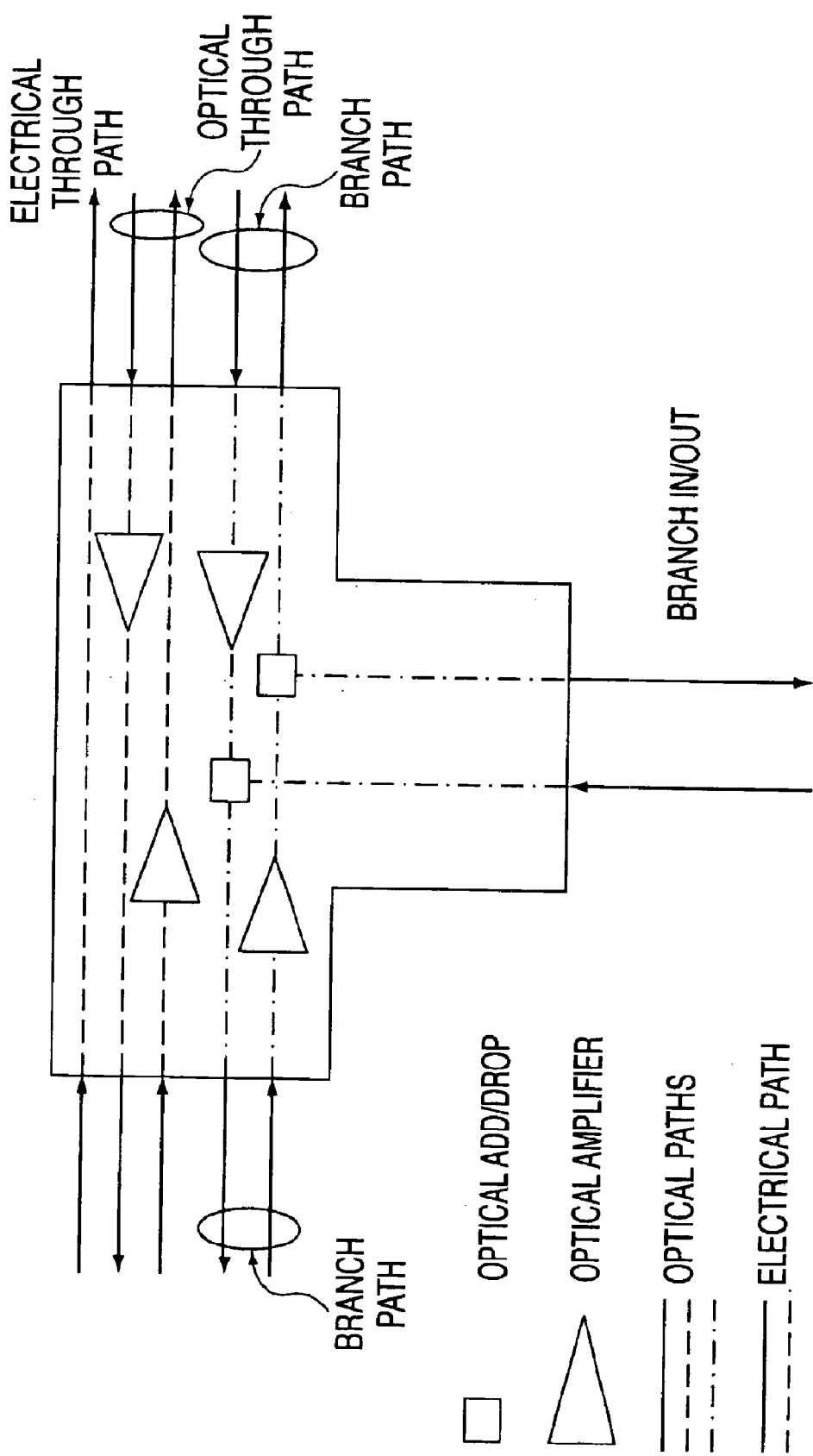
Figure 13:
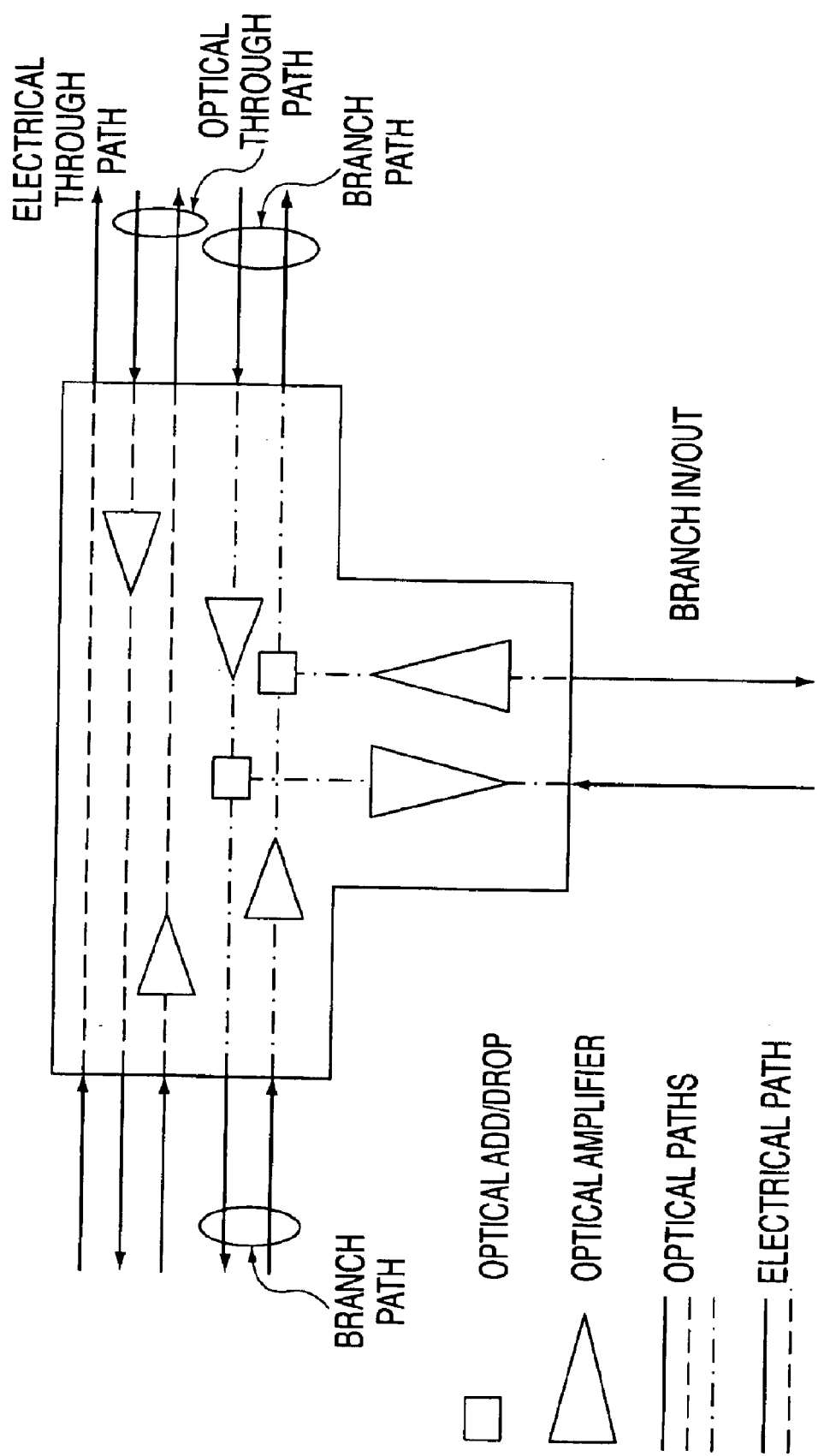
Figure 14:
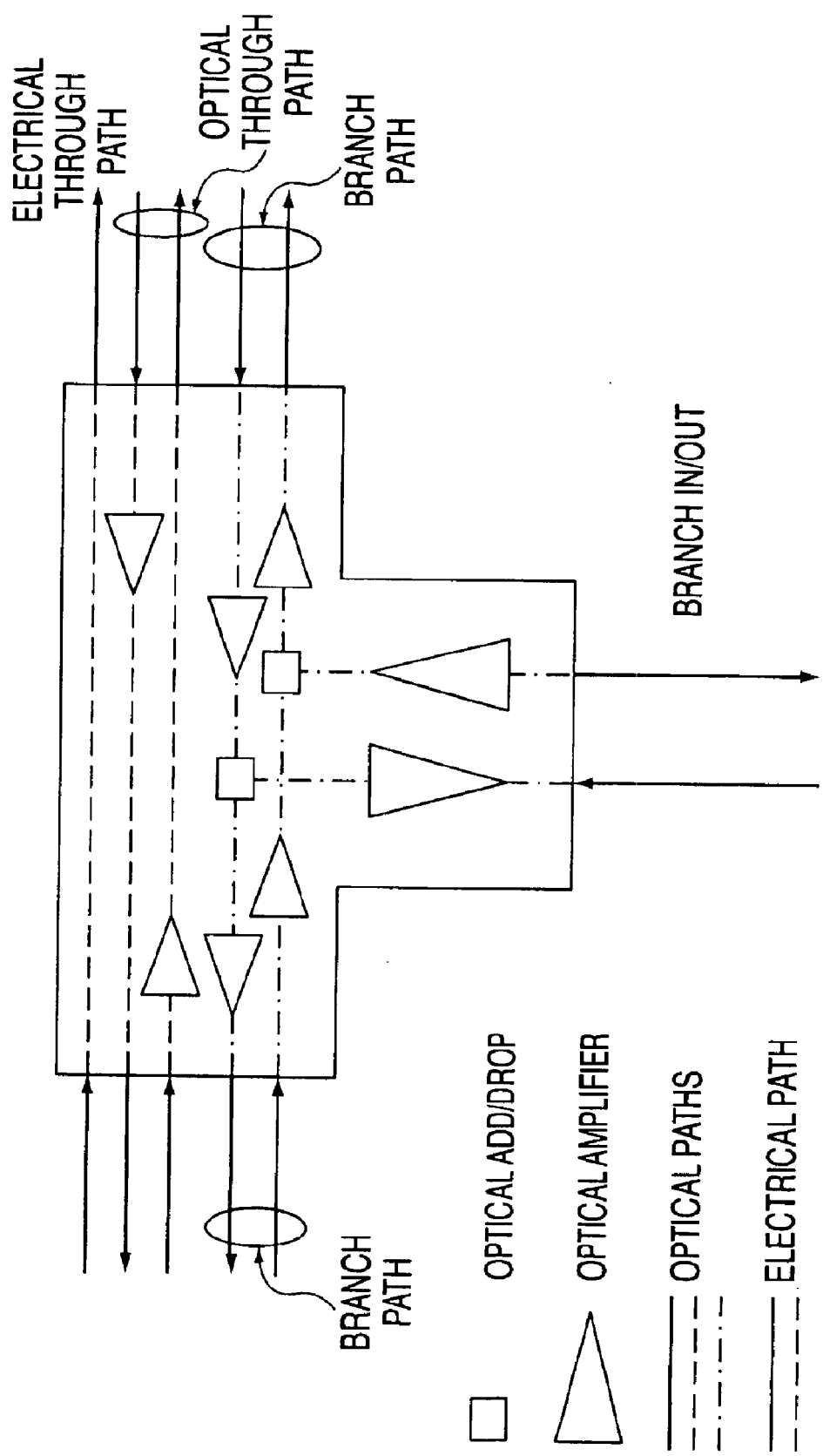
Figure 15:
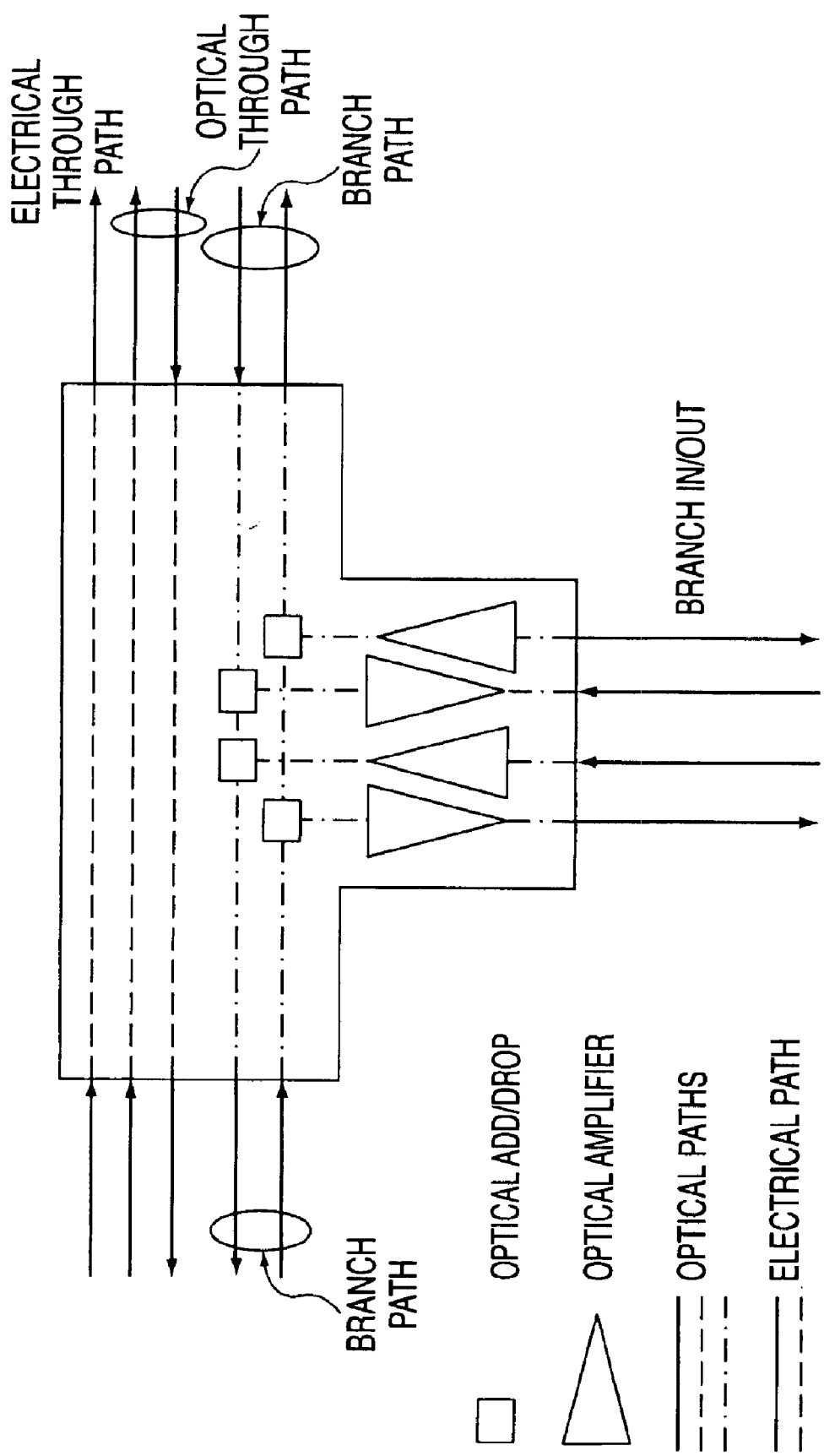
Figure 16:
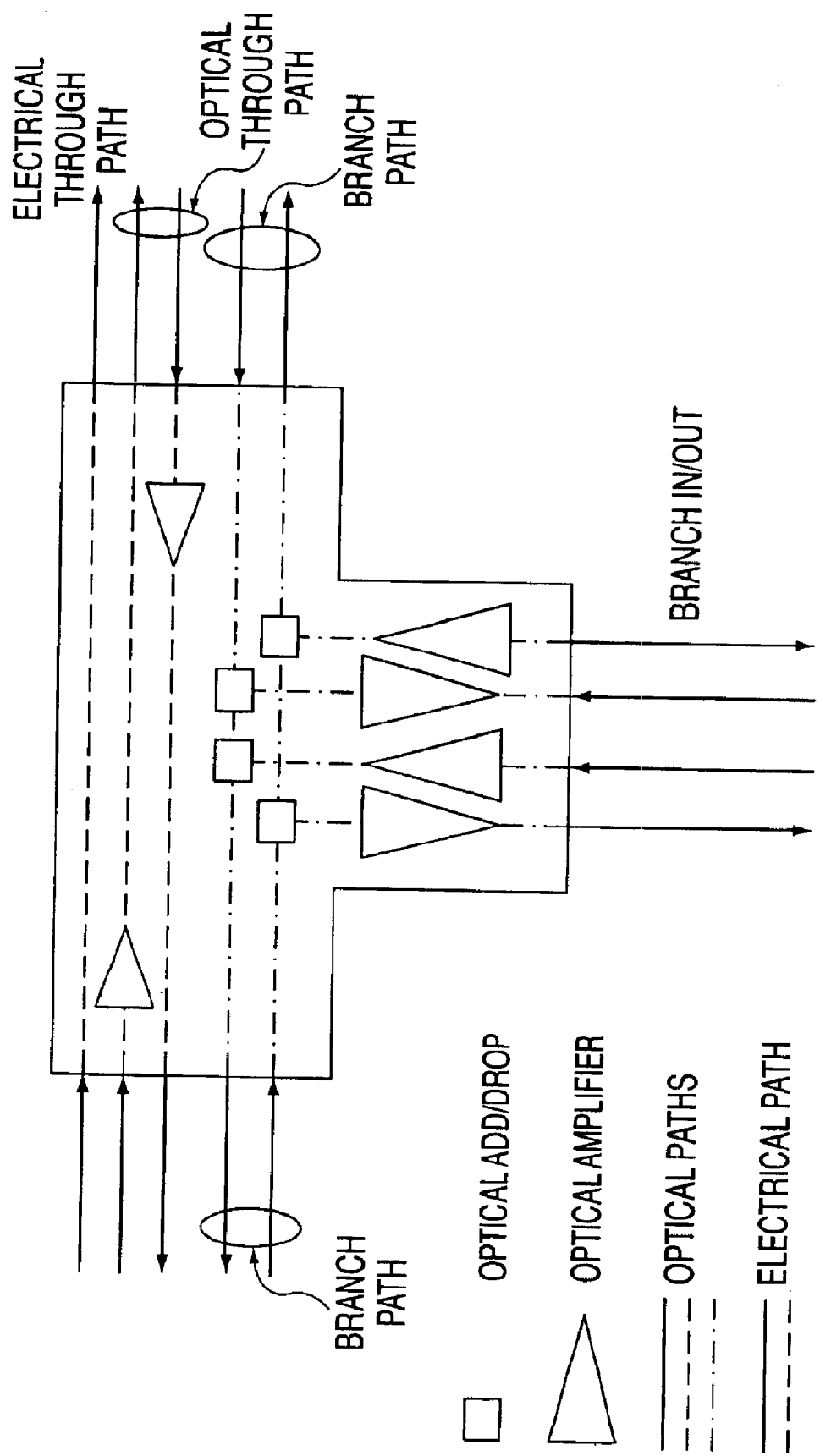
Figure 17:
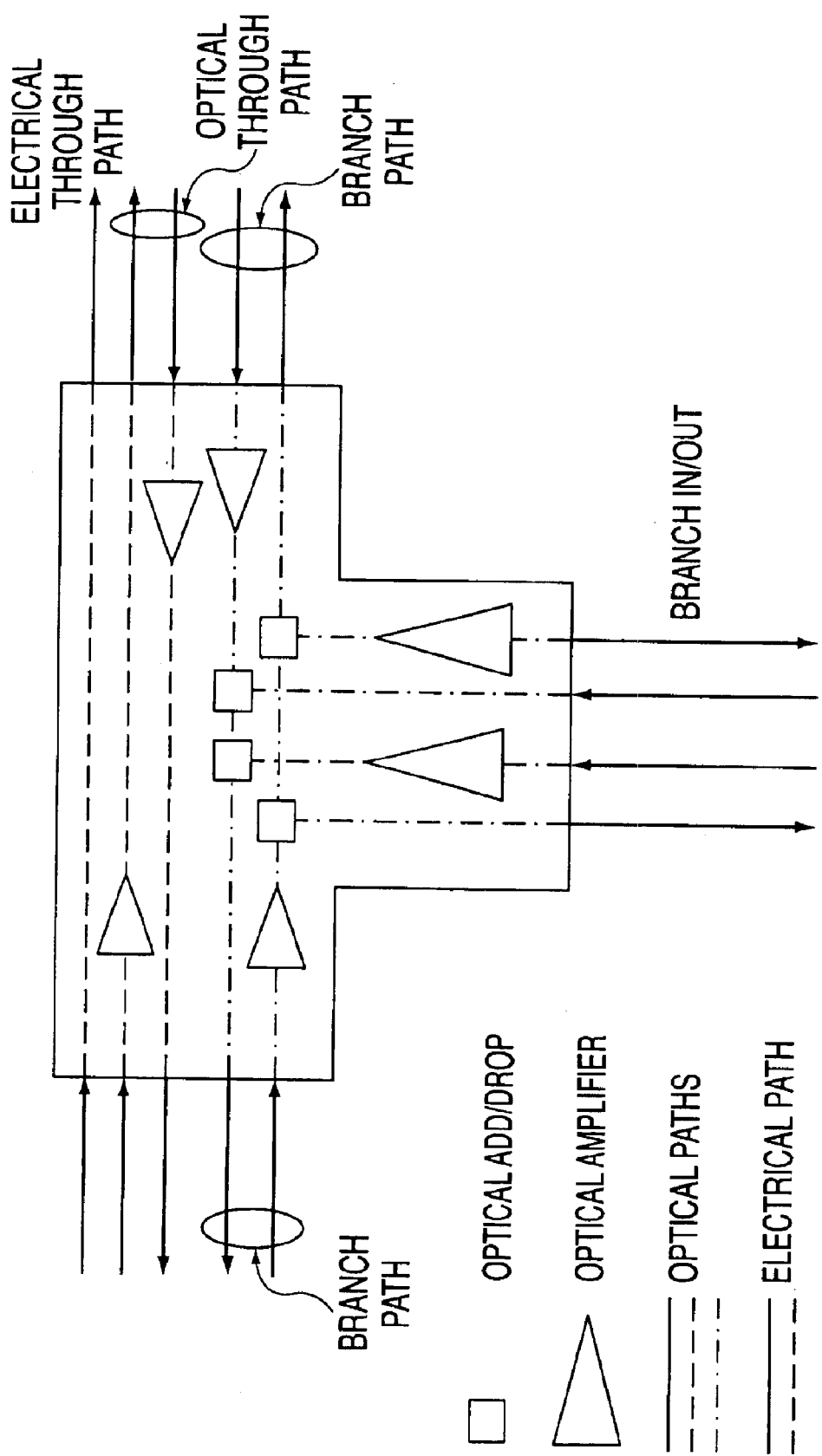
Figure 18:
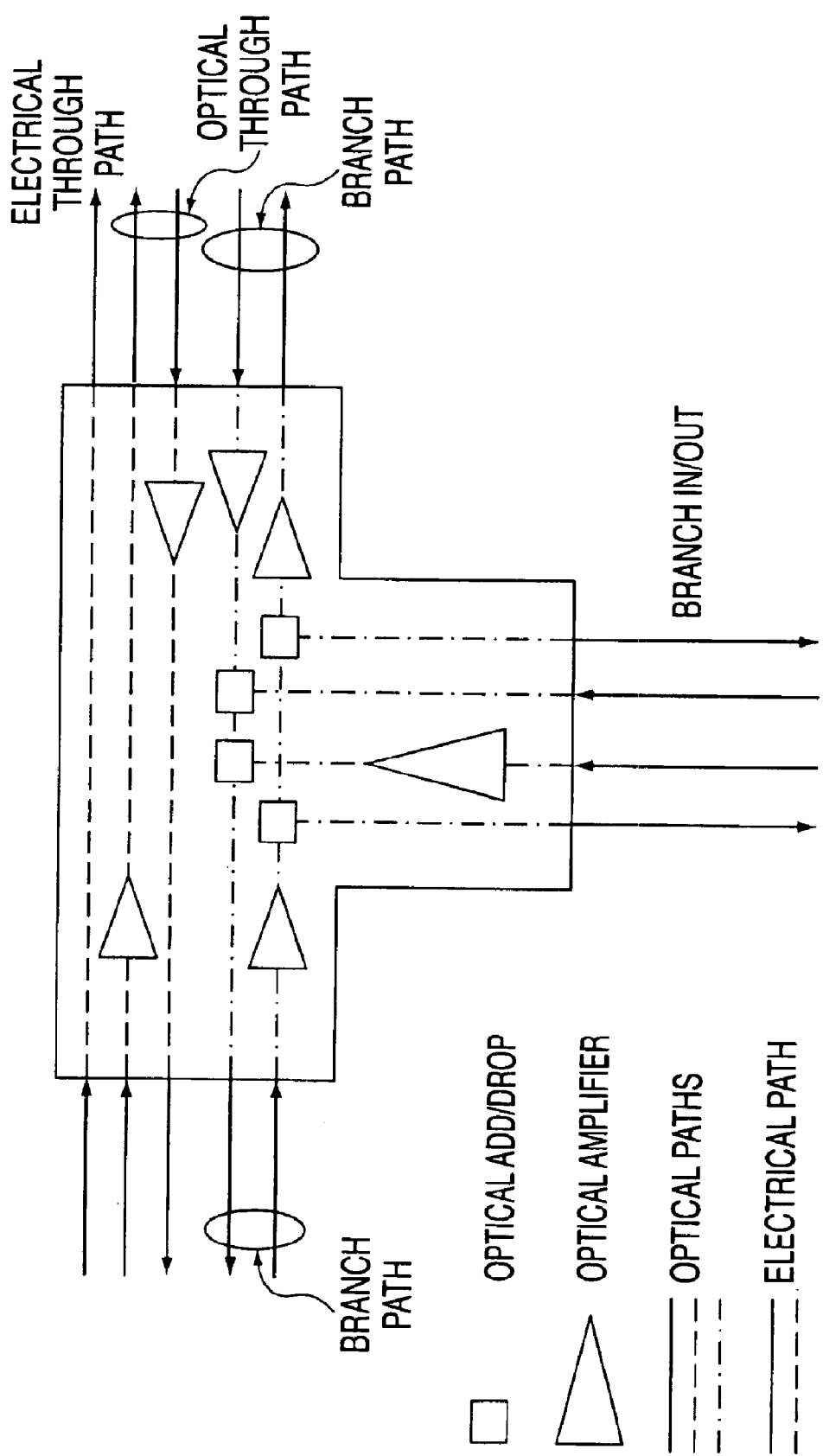

In yet other embodiments of the invention some or all of the through fibers also include optical amplifiers. For example, in FIG. 6, which is similar to FIG. 3, through fibers 212 and 213 include optical amplifiers 250 and 252, respectively. FIGS. 7–9 show other alternative embodiments of the invention that are similar to those shown in FIGS. 2, 4 and 5, except that in FIGS. 7–9 the through paths 212 and 213 also include optical amplifiers 250 and 252, respectively. Also, in FIGS. 8 and 9, optical fibers 240 and 242 include optical amplifiers 254 and 256, respectively. Of course, the present invention encompasses many additional variants as well, a few of which are shown in FIGS. 10–19.

Since the transmission span between branch 206 and branch terminal 113 is unrepeatered, in some embodiments of the invention it may be advantageous to use one or more repeaterless transmission techniques to extend its transmission length. For example, Raman amplication may be provided to this span, with the pump energy being introduced at the branch terminal. Alternatively, a remote optically pumped amplifier (ROPA) may be used, wherein the pump energy for a rare-earth doped fiber located along the span would be supplied from the branch terminal. Such techniques can potentially increase the distance between the branch 206 and the branch terminal 113 up to about 175 km or more.

What is claimed is:

1. A branching unit for interconnecting at least three undersea optical transmission cables, said branching unit comprising:

first, second and third ports for receiving first, second and third undersea optical transmission cables, respectively, said first and second cables each including an electrical power conductor and a plurality of first optical fibers, said third cable being electrically unpowered and including at least one drop optical fiber and at least one add optical fiber;

an electrical power conductor segment for electrically coupling the conductor in the first cable received in the first port to the conductor in the second cable received in the second port;

a first optical fiber segment optically coupling a first of the plurality of first optical fibers in one of the first or second cables to the drop optical fiber of the third cable;

a second optical fiber segment optically coupling a second of the plurality of first optical fibers in one of the first and second cables to the add optical fiber of the third cable;

first and second optical amplifiers located along the first and second optical fiber segments, respectively so that the first optical amplifier provides optical gain to traffic being dropped on the drop optical fiber of the third cable and the second optical amplifier provides optical gain to traffic being added on the add optical fiber of the third cable; and at least one electrically conductive path for supplying electrical energy from at least one of the electrical power conductors to each of the optical amplifiers.

2. The branching unit of claim 1 wherein the third cable includes a plurality of drop optical fibers and a plurality of add optical fibers and further comprising:

a third optical fiber segment optically coupling a first of the plurality of first optical fibers in the other of the first or second cables to one of the drop optical fibers of the third cable; and a fourth optical fiber segment optically coupling a second of the plurality of first optical fibers in the other of the first and second cables to the one of the add optical fiber of the third cable.

3. The branching unit of claim 2 further comprising third and fourth optical amplifiers located along the third and fourth optical fiber segments, respectively so that the third optical amplifier provides optical gain to traffic being dropped and the fourth optical amplifier provides optical gain to traffic being added; and at least a second electrically conductive path for supplying electrical energy from at least one of the electrical power conductors to each of the optical amplifiers.

4. The branching unit of claim 1 wherein said first and second cables each include a third optical fiber and further comprising another optical fiber segment optically couping the third optical fiber of the first cable to the second optical fiber of the second cable.

5. The branching unit of claim 4 further comprising another optical amplifier located along said another optical fiber segment for providing optical gain to through traffic traversing said another optical fiber segment.

6. A branching unit for interconnecting at least three undersea optical transmission cables, said branching unit comprising:

first, second and third ports for receiving first, second and third undersea optical transmission cables, respectively, said first and second cables each including an electrical power conductor and a plurality of first optical fibers, said third cable being electrically unpowered and including at least one drop optical fiber and at least one add optical fiber;

an electrical power conductor segment for electrically coupling the conductor in the first cable received in the first port to the conductor in the second cable received in the second port;

a first optical fiber segment optically coupling a first of the plurality of first optical fibers in the first cable to a first of the plurality of first optical fibers in the second cable;

a second optical fiber segment optically coupling a second of the plurality of first optical fibers in the first cable to a second of the plurality of first optical fibers in the second cable;

a first add/drop element located along the first optical fiber segment for dropping traffic at one or more selected wavelengths to the drop optical fiber of the third cable;

a second add/drop element located along the second optical fiber segment for adding traffic at one or more selected wavelengths to the add optical fiber of the third cable;

a first optical amplifier receiving the traffic from the first add/drop element and providing optical gain thereto;

a second optical amplifier receiving the traffic from the add optical fiber of the third cable and providing optical gain thereto at least one electrically conductive path for supplying electrical energy from at least one of the electrical power conductors to each of the optical amplifiers.

7. The branching unit of claim 6 wherein the third cable includes a plurality of drop optical fibers and a plurality of add optical fibers and further comprising:

a third add/drop element located along the first optical fiber segment for adding traffic at one or more selected wavelengths from one of the plurality of add optical fibers to the first optical fiber segment;

a fourth add/drop element located along the second optical fiber segment for dropping traffic at one or more selected wavelengths to one of the drop optical fibers of the third cable.

8. The branching unit of claim 7 further comprising a third optical amplifier receiving the traffic from one of the plurality of add optical fibers and providing gain to the traffic directed to the third add/drop element;

a fourth optical amplifier receiving the traffic from the fourth add/drop element and providing gain to the traffic directed to one of the drop optical fibers of the third cable.

9. The branching unit of claim 6 wherein said first and second cables each include a third optical fiber and further comprising another optical fiber segment optically couping the third optical fiber of the first cable to the second optical fiber of the second cable.

10. The branching unit of claim 9 further comprising another optical amplifier located along said another optical fiber segment for providing optical gain to through traffic traversing said another optical fiber segment.

11. In an undersea optical transmission system that includes a plurality of land-based trunk terminals in optical communication with one another over at least first and second optical transmission trunk cables and a remotely located land-based branch terminal in optical communication with at least one of the trunk terminals over an optical transmission branch cable, a branching unit interconnecting the first and second trunk cables with the branch cable, said branching unit comprising:

first, second and third ports for receiving first and second trunk cables and the branch cable, respectively, said first and second trunk cables each including an electrical power conductor and a plurality of first optical fibers, said branch cable being electrically unpowered and including at least one drop optical fiber and at least one add optical fiber;

an electrical power conductor segment for electrically coupling the conductor in the first cable received in the first port to the conductor in the second cable received in the second port;

a first optical fiber segment optically coupling a first of the plurality of first optical fibers in one of the first or second cables to the drop optical fiber of the branch cable;

a second optical fiber segment optically coupling a second of the plurality of first optical fibers in one of the first and second cables to the add optical fiber of the branch cable;

first and second optical amplifiers located along the first and second optical fiber segments, respectively so that the first optical amplifier provides optical gain to traffic being dripped on the drop optical fiber of the branch cable and the second optical amplifier provides optical gain to traffic being added on the add optical fiber of the branch cable; and at least one electrically conductive path for supplying electrical energy from at least one of the electrical power conductors to each of the optical amplifiers.

* * * * *